(12) United States Patent
Berkenkamp et al.

(10) Patent No.: US 12,246,450 B2
(45) Date of Patent: Mar. 11, 2025

(54) DEVICE AND METHOD TO IMPROVE LEARNING OF A POLICY FOR ROBOTS

(71) Applicant: Robert Bosch GmbH, Stuttgart (DE)

(72) Inventors: Felix Berkenkamp, Munich (DE); Lukas Froehlich, Freiburg (DE); Maksym Lefarov, Stuttgart (DE); Andreas Doerr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 487 days.

(21) Appl. No.: 17/652,983

(22) Filed: Mar. 1, 2022

(65) Prior Publication Data

US 2022/0297290 A1 Sep. 22, 2022

(30) Foreign Application Priority Data

Mar. 16, 2021 (EP) .................................... 21162920

(51) Int. Cl.
*B25J 9/16* (2006.01)
*G06F 17/17* (2006.01)

(52) U.S. Cl.
CPC .............. *B25J 9/163* (2013.01); *G06F 17/17* (2013.01)

(58) Field of Classification Search
CPC .................................. B25J 9/163; G06F 17/17
See application file for complete search history.

(56) References Cited

U.S. PATENT DOCUMENTS

| | | | | |
|---|---|---|---|---|
| 10,558,929 B2* | 2/2020 | Alam | ...................... | G06Q 10/00 |
| 2016/0258782 A1* | 9/2016 | Sadjadi | .................. | A61B 34/10 |
| 2019/0258254 A1* | 8/2019 | Kadin | ..................... | G06N 5/043 |
| 2021/0178600 A1* | 6/2021 | Jha | .......................... | B25J 9/1697 |
| 2022/0261630 A1* | 8/2022 | Fulton | ...................... | G06N 7/01 |

OTHER PUBLICATIONS

Janner et al., "When to Trust Your Model: Model-Based Policy Optimization," 33rd Conference on Neural Information Processing Systems (NEURIPS2019), vol. 32, 2019, pp. 1-12. <https://dl.acm.org/doi/pdf/10.5555/3454287.3455409> Downloaded Feb. 28, 2021.

(Continued)

*Primary Examiner* — Basil T. Jos
*Assistant Examiner* — Jay Khandpur
(74) *Attorney, Agent, or Firm* — Norton Rose Fulbright US LLP (57) ABSTRACT

A computer-implemented method for for learning a policy. The method includes: recording at least an episode of interactions of the agent with its environment following policy and adding the recorded episode to a set of training data; optimizing a transition dynamics model based on the training data such that the transition dynamics model predicts the next states of the environment depending on the states and actions contained in the training data; optimizing policy parameters based on the training data and the transition dynamics model by optimizing a reward. In the method, the transition dynamics model comprises a first model characterizing the global model and a second model characterizing a correction model, which is configured to correct outputs of the first model.

10 Claims, 8 Drawing Sheets

(56) References Cited

OTHER PUBLICATIONS

Doerr et al., "Optimizing Long-Term Predictions for Model-Based Policy Search," 1st Conference on Robot Learning (CORL 2017), vol. 78, 2017, pp. 1-12. <http://proceedings.mlr.press/v78/doerr17a/doerr17a.pdf> Downloaded Feb. 28, 2021.

Bristow et al., "A Survey of Iterative Learning Control," IEEE Control Systems Magazine, vol. 26, No. 3, 2006, pp. 96-114. <https://www.researchgate.net/publication/3207727_A_survey_of_iterative_learning> Downloaded Feb. 28, 2021.

Haarnoja et al., "Soft Actor-Critic: Off-Policy Maximum Entropy Deep Reinforcement Learning With a Stochastic Actor," Proceedings of the 35th International Conference on Machine Learning, Stockholm, Sweden, PMLR 80, 2018, pp. 1-10. <https://proceedings.mlr.press/v80/haarnoja18b/haarnoja18b.pdf> Downloaded Feb. 28, 2021.

Heess et al., "Learning Continuous Control Policies By Stochastic Value Gradients," Advances in Neural Information Processing Systems, vol. 28, 2015, pp. 1-9. <https://proceedings.neurips.cc/paper/2015/file/148510031349642de5ca0c544f31b2ef-Paper.pdf> Downloaded Feb. 28, 2021.

Lee et al., "Bayesian Residual Policy Optimization: Scalable Bayesian Reinforcement Learning With Clairvoyant Experts," Cornell University Library, 2020, pp. 1-12.

Silver et al., "Residual Policy Learning," Cornell University Library, 2019, pp. 1-12.

Johannink et al., "Residual Reinforcement Learning for Robot Control," 2019 International Conference on Robotics and Automation (ICRA), Palais Des Congres De Montreal, Montreal, Canada, 2019, pp. 6023-6029.

Ma et al., "Efficient Insertion Control for Precision Assembly Based on Demonstration Learning and Reinforcement Learning," IEEE Transactions on Industrial Informatics, vol. 17, No. 7, 2021, pp. 4492-4502.

\* cited by examiner

DEVICE AND METHOD TO IMPROVE LEARNING OF A POLICY FOR ROBOTS

CROSS REFERENCE

The present application claims the benefit under 35 U.S.C. 119 of European Patent Application No. EP 21 16 2920.9 filed on Mar. 16, 2021, which is expressly incorporated herein by reference in its entirety.

FIELD

The present invention concerns a method for learning a policy by an improved model of an environment, a computer program and a machine-readable storage medium, a system carrying out said method.

BACKGROUND INFORMATION

In reinforcement learning, the goal is to control a real, unknown stochastic system characterized by the transition dynamics p:

$$s_{t+1} \sim p(s_{t+1}|s_t, a_t) \qquad \text{eq.(1):}$$

which encodes the probability distribution over the next state $p(s_{t+1}|s_t, a_t)$.

Note that a deterministic system is explicitly allowed as a special case of a stochastic system. The system is controlled by a stochastic (or deterministic) policy $\pi_\theta: \mathbb{N}_{\geq 0} \times \mathbb{R}^n \to \mathbb{R}^m$ so that $\pi_\theta$ depends on the time step t and the corresponding state $s_t$ and is parameterized by θ.

The goal of reinforcement learning is to find policy parameters θ that maximize the expected reward r over some time horizon H. An infinite horizon, i.e., H=∞, is allowed. The resulting optimization problem is:

$$\max_\theta E\left[\sum_{t=0}^{H} \gamma^t\, r(s_t, \pi(s_t))\right] \qquad \text{eq. (2)}$$

$$a_t \sim \pi_\theta(a_t|t, s_t)$$

$$s_{t+1} \sim p(s_{t+1}|s_t, a_t)$$

where $0 \leq \gamma \leq 1$ denotes the so-called discount factor and r(•) is the stage reward.

In practice, the exact dynamics p are unknown. One way out would be to collect data from interacting with the real system p and use it to optimize the policy. Another way to do so is model-based reinforcement learning, where an approximate dynamics model $\tilde{p}$ is learned based on trajectory data from eq. (1). That is, a current policy $\pi_\theta$ is applied to the system and recording state-transitions in line 4 of the following Pseudo Code:
Pseudo Code for General Model-Based Reinforcement Learning:

```
1:   Initialize policy π and model p̃
2:   D_env ← Ø or initialize data
3:   while not converged do
4:       Collect episode date from real system p with policy
π_θ and add to D_env
5        Improve model p̃ based on D_env
6:       Optimize policy parameters θ based on D_env and p̃
7:   end while
```

A key challenge is that the learned model is inevitably only an approximation of the real world, so that $\tilde{p}_t \neq p$. As a consequence, the expectations in eq. (2) are over different state distributions, which can lead to slow convergence and even sub-optimal solutions on the real system p in eq. (2), which is a problem that shall be solved by the present invention.

There are two main ways to mitigate model errors. One is to improve model training of the Pseudo Code in line 5, while alternative approaches focus on policy optimization in line 6.

Michael Janner, Justin Fu, Marvin Zhang, and Sergey Levine, "When to trust your model: Model-based policy optimization," in Advances in Neural Information Processing Systems, volume 32, pages 12519-12530, Curran Associates, Inc., 2019, describe, to simulate only short horizons with the model, starting from states selected i.i.d. from $D_{env}$. Since simulation errors compound with the length of the horizon, this recudes the size of the error. However, it does not resolve the fundamental problem of model-errors from the rollouts and makes the rollout horizon a fundamental (and challenging to tune) hyperparameter.

Andreas Doerr, Christian Daniel, Duy Nguyen-Tuong, Alonso Marco, Stefan Schaal, Toussaint Marc, and Sebastian Trimpe, "Optimizing long-term predictions for model-based policy search," volume 78 of Proceedings of Machine Learning Research, pages 227-238, PMLR, 13-15 Nov 2017. URL http://proceedings.mlr.press/v78/doerr17a.html, instead focus on learning an approximate model to have low error on long-term prediction tasks.

Iterative learning control (D. A. Bristow, M. Tharayil, and A. G. Alleyne, "A survey of iterative learning control," IEEE Control Systems Magazine, 26(3):96-114, 2006) describes a class of methods that focus on a specific sub-case of model-based RL, where both the policy π and learned model are fixed, except for time-dependent error terms that can be computed in closed-form based on a linearization of its learned model and a reward function that is quadratic in state and actions.

SUMMARY

In accordance with the present invention, it is proposed to use data $D_{env}$ to learn or improve a (potentially time-dependent) model $\tilde{p}_t$ from collected data from interacting with the environment. Lastly, the policy parameters are optimized based on this learned model by approximately solving:

$$\max_\theta E\left[\sum_{t=0}^{H} \gamma^t\, r(\tilde{s}_t, \tilde{a}_t)|s_0\right] \qquad \text{eq. (3)}$$

$$a_t \sim \pi_\theta(a_t|s_t)$$

$$s_{t+1} \sim \tilde{p}_t(s_{t+1}|t, s_t, a_t)$$

e.g., in line 6 of the Pseudo Code.

For this purpose, a particular form of model-learning that can be used in addition to other model-learning methods to improve learning performance is proposed. In particular, while existing approaches only learn a global model g of the real dynamics p based on the environment data, it is proposed to additionally learn a (on-policy) correction term. The resulting model approximation is then given by:

$$\tilde{p}_t(s, a) = g(s, a) + d_t(s) \qquad \text{eq.(4):}$$

with the global model g and an on-policy correction model $d_t$, which can be state dependent.

If the global model and/or the correction term $d_t$ are probabilistic, the sum operation is interpreted as a sum of random variables encoded by the distributions.

While the global model g approximates the dynamics globally (including off-policy, or in other words, for all collected data during the RL procedure), the on-policy correction ensures low error on-policy (or in other words, data that has been collected with a policy that is similar to the current one).

If sequences of actions are replayed from an episode in $D_{env}$ with the expected transition dynamics as proposed in eq. (4), the exact episode data from the real environment can be obtained. As a result, the on-policy model error in eq. (3) is reduced, which leads to improved stability and data-efficiency when optimizing policies.

In the special cast of deterministic transition dynamics and policies, the correction term leads to zero-error in the on-policy model.

In a first aspect, the present invention is concerned with a computer-implemented method for learning a policy for an agent, in particular an at least partly autonomous robot. A policy can be configured to output an action or a distribution over actions depending on a current state. If following the proposed actions by the policy, a goal, for which the policy has been optimized preferably by reinforcement learning, will be achieved.

In accordance with an example embodiment of the present invention, the method begins with initializing policy $\pi_\theta$ and transition dynamics model $\tilde{p}$, which predicts, depending on both a current state ($s_e$) and an action (a), a distribution over the next state ($s_{t+1}$) of an environment and/or of the agent, in case the agent carried out said action (a). Therefore, it can be said that the transition dynamics model approximates transition probabilities or deterministic transitions and outputs the next state. It is noted that the environment can also be a system, wherein the agent is, e.g., an actor of the system. The transition dynamics model takes the current state and an action, e.g., action determined by the policy, as input and returns either the next state or a distribution over the next states.

In accordance with an example embodiment of the present invention, thereupon follows repeating the following steps until a termination condition is fulfilled:

Recording at least an episode of interactions of the agent with its environment by following the policy $\pi_\theta$ and adding the recorded eposiode to a set of training data $D_{env}$. The episode can be a trajectory of the agent.

The recorded interactions can comprise pairs of states and applied actions or applied actions and thereupon reached next states. Then, an episode comprises all pairs beginning from the first action till the last action. The step of recording interactions can be performed in a real world setting. Additionally or alternatively, this step is carried out by a simulation of the environment. States are typically sensed by a sensor, wherein the sensor either senses the state of the agent and/or the state of the environment of the agent, which is then used as input for the policy. In case of a simulation of the environment, the state is simulated.

Episodes can be collected synchronously or asynchronously, on-policy or off-policy and with full or partial trajectories.

After adding the episode to the trained data, an optimization of the transition dynamics model ($\tilde{p}$) follows based on the training data $D_{env}$ such that the transition dynamics model ($\tilde{p}$) predicts the next states of the environment depending on the states and actions contained in the training data $D_{env}$. Interestingly, all recorded episodes can be reused independently of the progress of the trained policy. This property makes this step very sample efficient.

The transition dynamics model ($\tilde{p}$) includes a first model (g) characterizing the global model and a correction model ($d_t$), also referred to as on-policy correction model, which is configured to correct outputs of the first model. In other words, the transition dynamics model is a superposition of the first and second model. In the following, the correction model is also referred to as correction term. The transition dynamics model $\tilde{p}$ is configured to predict the next state in which the environment and/or the agent will be when carrying out a predefined action for the current state. It therefore predicts the state for the next time step, wherein the time step can relate to the point in time when an action is carried out or a state is sensed. The time step can also be a discrete value characterizing the number of actions carried out since a predefined start point. The correction model is configured to correct errors of the first model with respect to the true state of the environment after carrying out an action. For example, the first model predicts a state of the environment depending on a current state and an action, e.g. which was determined by the policy. Then, the correction model corrects the predicted state of the first model such that the predicted state is as similar as possible to the true state of the environment after the agent carried out said action for the current state. In other words, the correction model corrects the output of the first model to obtain a predicted state that is as close as possible to the state which the environment would take on. Therefore, the correction model corrects the first model to obtain a more accurate state with regarding to the environment, in particular environment dynamics.

It is noted that the transition dynamic model is learned to approximate the dynamics of the environment and preferably of the agent. This can achieve that said model predicts as accurate as possible the states based on the episode data from $D_{env}$.

Preferably, the first model is dependent on the current state of the environment and the action and outputs a predicted state of the environment if carrying out the inputted action. The correction term either depends on a time or time step and/or the current state. Alternatively, the correction term is an extracted correction value, which is determined by a difference between the recorded states of the training data and the predicted states by the first model. The correction term outputs a correction for the first model. The first model is parametrized, wherein its parameters are optimized in the step optimizing the transition dynamics model. In contrast, the correction model outputs either discrete corrections, which can be added directly to the first model, or the correction term is also parametrized and optimized on the difference between the recorded states of the training data and the predicted states by the first model. A special case of the correction term is a not parameterized function, but instead consist of time-discrete error terms.

After the previous step is finished, thereupon follows optimizing policy $\pi_\theta$ parameters $\theta$ based on the training data $D_{env}$ and the transition dynamics model $\tilde{p}$ by optimizing a reward r over at least one episode by following the (current) policy $\pi_\theta$, wherein the transition dynamics model $\tilde{p}$ is used to predict the next state when applying the policy. In other words, the policy is not applied on the environment, instead it interacts with the transition dynamics model. This optimization step can be also referred to as optimizing the policy by model-based reinforcement learning. Said optimization includes updating the parameters of the policy, in particular depending on the reward.

Given the learned transition dynamics model $\tilde{p}$, any policy-optimization method can be used. Examples include soft actor-critic (Tuomas Haarnoja, Aurick Zhou, Pieter Abbeel, and Sergey Levine, "Soft actor-critic: Off-policy maximum entropy deep reinforcement learning with a stochastic actor," 2018.), or stochastic value gradients (Nicolas Heess, Gregory Wayne, David Silver, Timothy Lillicrap, Tom Erez, and Yuval Tassa. "Learning continuous control policies by stochastic value gradients," in C. Cortes, N. Lawrence, D. Lee, M. Sugiyama, and R. Garnett, editors, Advances in Neural Information Processing Systems, volume 28, pages 2944-2952. Curran Associates, Inc., 2015. URL https://proceedings.neurips.cc/paper/2015/file/148510031349642de5ca0c544f31b2ef-Paper.pdf), among many others.

The policy can be a neural network, or any other parametrized distribution or deterministic function over actions.

A reward indicates the quality of the state and/or action that was taken. Typically, this reward signal is designed to steer the behavior of the learning algorithm. Generally, the reward signal attribute large values to states/actions that are desirable and small (or negative) values to states/actions that should be avoided by the agent. Possible reward signals include but are not limited to: negative tracking error for some reference state signal, indicator function for the success of a particular task or smoothed variants of that (e.g., exponential functions), negative quadratic cost terms (akin to methods from optimal control), etc. It is also possible to construct another reward signal as a weighted some of other reward signals if the learning algorithm should strive for multiple goals at the same time.

If the termination condition is not fulfilled, the just explained steps above will be repeated beginning with the recording of episodes. The termination condition can be a convergence criterion chosen with respect to the optimization of the policy. It is noted that the step of recording episodes can be skipped, if the transition dynamics model is accurate enough.

In other words, the proposed method of the first aspect in accordance with the present invention extend the transition dynamics model by adding a state and/or time-dependent term to decrease the model predictions on-policy, that is under actions selected by the current control policy. This has the advantage that the transition dynamics model becomes more accurate without additional interactions with the environment. Because the accuracy of the transition dynamics model is only improved for the parts which are relevant to learn the policy, in particular, is improved for said parts which are reached by following the policy, said method automatically concentrates only on the relevant parts of the global model to improve it.

In accordance with an example embodiment of the present invention, it is proposed that for optimizing the transition dynamics model ($\tilde{p}$), after optimizing the first model on the training data, the correction term is selected such that the transition dynamic model error is low for actions selected from the policy $\pi_\theta$ on the training data $D_{env}$. The correction model is adapted for the current policy to provide the most accurate transition dynamic model for each convergence state. Preferably, the correction model is optimized such that the error of the global model is minimal for the current policy, wherein the current policy is the policy which is currently optimized depending on the newly added training data.

Furthermore, in accordance with an example embodiment of the present invention, it is proposed that the correction term $d_t(s)$ is selected such that, if actions are selected exactly as in $D_{env}$, then the sequence of the expected transitions $E[\tilde{p}_t]$ will become equal to the training data. That is, selecting function $d_t$ to minimize some measure of the difference between the left and right-hand of the following equation.

$$E[d_t(s)] = \hat{s}_{t+1} - E[g(\tilde{s}_t, \tilde{a}_t)] \qquad \text{eq.(5):}$$

Furthermore, in accordance with an example embodiment of the present invention, it is proposed that the correction model $d_t$ is selected by minimizing a measure of the difference between the output of the correction model $d_t$ and the difference between the recorded state $\hat{s}_t$ of the training data and the expected predicted state by the first term $g$ of the transition dynamics model $\tilde{p}$.

Furthermore, in accordance with an example embodiment of the present invention, it is proposed that the correction model $d_t$ is optimized jointly with the first term $g$. Preferably, for optimizing the policy parameters $\theta$ the correction model $d_t$ could be re-weighted by the likelihood (or log-likelihood) of actions under the policy $\pi_\theta$ to ensure an on-policy model fit.

Joint optimization means that the transition dynamics model $\tilde{p}$ with its two terms are both updated within the same optimization step. This has the advantage that no errors of the first model have to be explicitly determined and optimizing the correction term on said errors is also not required. This speeds-up the method and further improves the accuracy of the transition dynamics model.

Furthermore, in accordance with an example embodiment of the present invention, it is proposed that the correction term $d_t$ is dependent on the state and/or time. The time can be the time elapsed since the beginning of the episode. During training the time elapsed since the beginning of the episode is the time, which can be measured from the point in time where the first state of the environment has been sensed till a current point in time, where the current state is sensed. The same definition can also be applied when utilizing the obtained policy according to the first aspect of the invention. Alternatively, the time can characterize a number of actions which has been carried out since the first action of the episode.

Furthermore, in accordance with an example embodiment of the present invention, it is proposed that the term d_t can only depend on time, in which case we can have a deterministic correction term $$d_t = \tilde{s}_{t+1} - E[g(\tilde{s}_t, \tilde{a}_t)]$$

that is fully specified given the data and the first model. If the environment is deterministic, then this time-dependent term leads to zero error model error when taking the actions $\tilde{a}_t$ in $\tilde{p}_\tau$ Furthermore, in accordance with an example embodiment of the present inventin, it is proposed that the correction term is a probabilistic function, wherein said probabilistic function is optimized by approximate inference. Approximate inference methods make it possible to learn realistic models from big data by trading off computation time for accuracy, when exact learning and inference are computationally intractable.

The determined action of the policy can be utilized to provide a control signal for controlling an actor of the agent, comprising all the steps of the above method for controlling the robot and further comprising the step of: Determining said actuator control signal depending on said output signal.

Preferably said actuator controls at least a partially autonomous robot and/or a manufacturing machine and/or an access control system.

It is noted that the policy can be learned for controlling dynamics and/or stability of the agent. The policy can receive as input sensor values characterizing the state of the agent and/or the environment. The policy is trained to follow an optimal trajectory by maximizing the stage reward. The policy outputs values characterizing control values such that the agent would follow the optimal trajectory.

Example embodiments of the present invention will be discussed with reference to the following figures in more detail.

DETAILED DESCRIPTION OF EXAMPLE EMBODIMENTS

In model-based reinforcement learning, an approximate model $\tilde{p}$ of transition probabilities or deterministic transitions of a real system p are learned. That is, the learned model takes as input the current state and control action, and returns either the next state or a distribution over the next state. This model can be consequently used to optimize a policy using existing policy optimization methods in conjunction with $\tilde{p}$. The proposed on-policy corrections take a fixed or learned approximation to $\tilde{p}$, and extend it with a state and/or time-dependent term to decrease the model predictions on-policy, that is under actions selected by the current control policy $\pi$.

Figure 1:
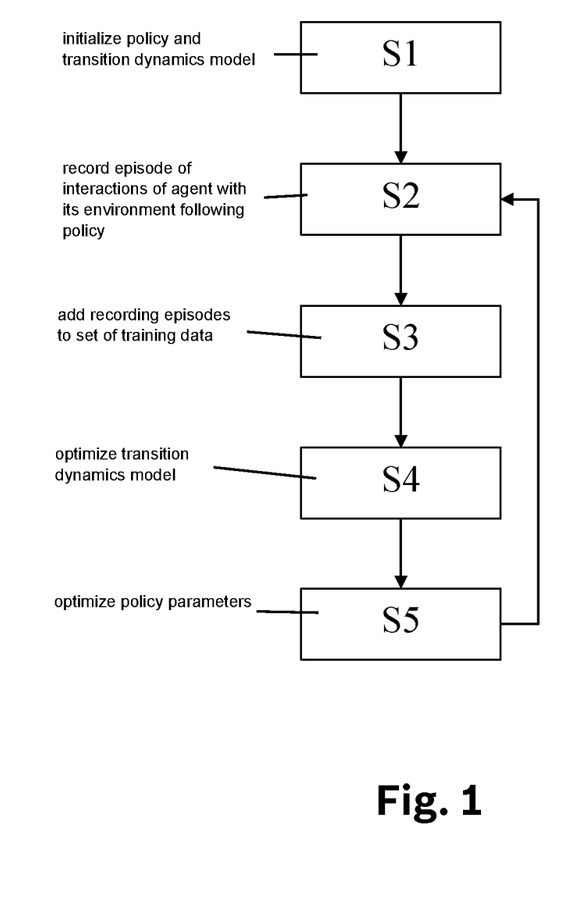
FIG. 1 shows a flow-chart diagram of a method, in accordance with an example embodiment of the present invention.

Shown in FIG. 1 is a flow-chart diagram of an embodiment of the method for learning a policy for controlling a robot.

The method starts with Initializing (S1) policy ($\pi_\theta$) and transition dynamics model ($\tilde{p}$), which predicts a next state ($s_{t+1}$) of the environment and/or the agent in case the agent carries out an action (a) depending on both a current state ($s_t$) and said action (a).

Thereupon follows a loop until a termination condition is fulfilled:

The first step of the loop is recording (S2) at least one episode of interactions of the agent with its environment following policy ($\pi_\theta$). Subsequently, the recorded episodes are added (S3) to a set of training data ($D_{env}$)

After that, the step optimizing (S4) is carried out. Here, the transition dynamics model ($\tilde{p}$) is optimized based on the training data ($D_{env}$) such that the transition dynamics model ($\tilde{p}$) predicts the next states of the environment depending on the states and actions contained in the training data ($D_{env}$).

The global part g of the model $\tilde{p}$ can be learned using any existing method, including approximate inference, methods that minimize prediction errors, and method to optimize long-term prediction errors. The correction term $d_t$ is optimized with respect to eq. 5 above.

After finishing step S4, step S5 follows. This step comprises optimizing policy ($\pi_\theta$) parameters ($\theta$) based on the training data ($D_{env}$) and the transition dynamics model ($\tilde{p}$) by optimizing a reward over at least one episode by following the policy ($\pi_\theta$). Given the transition dynamics model ($\tilde{p}$) of step S4, any policy-optimization method can be used. Examples include soft actor-critic, stochastic value gradients, proximal policy optimization and maximum a-posteriori policy optimization, among many others.

If step S5 has been finished and the termination condition is not fulfilled, the loop can be repeated.

If the loop has terminated, the resulting optimized policy can be used to compute a control signal for controlling a physical system, e.g., a computer-controlled machine, a robot, a vehicle, a domestic appliance, a power tool, a manufacturing machine, or an access control system. It does so by learning a policy for controlling the physical system and then operating the physical system accordingly. Generally speaking, a policy obtained as described above interacts with any kind of system. As such the range of application is very broad. In the following some applications are exemplarily described.

Figure 2:
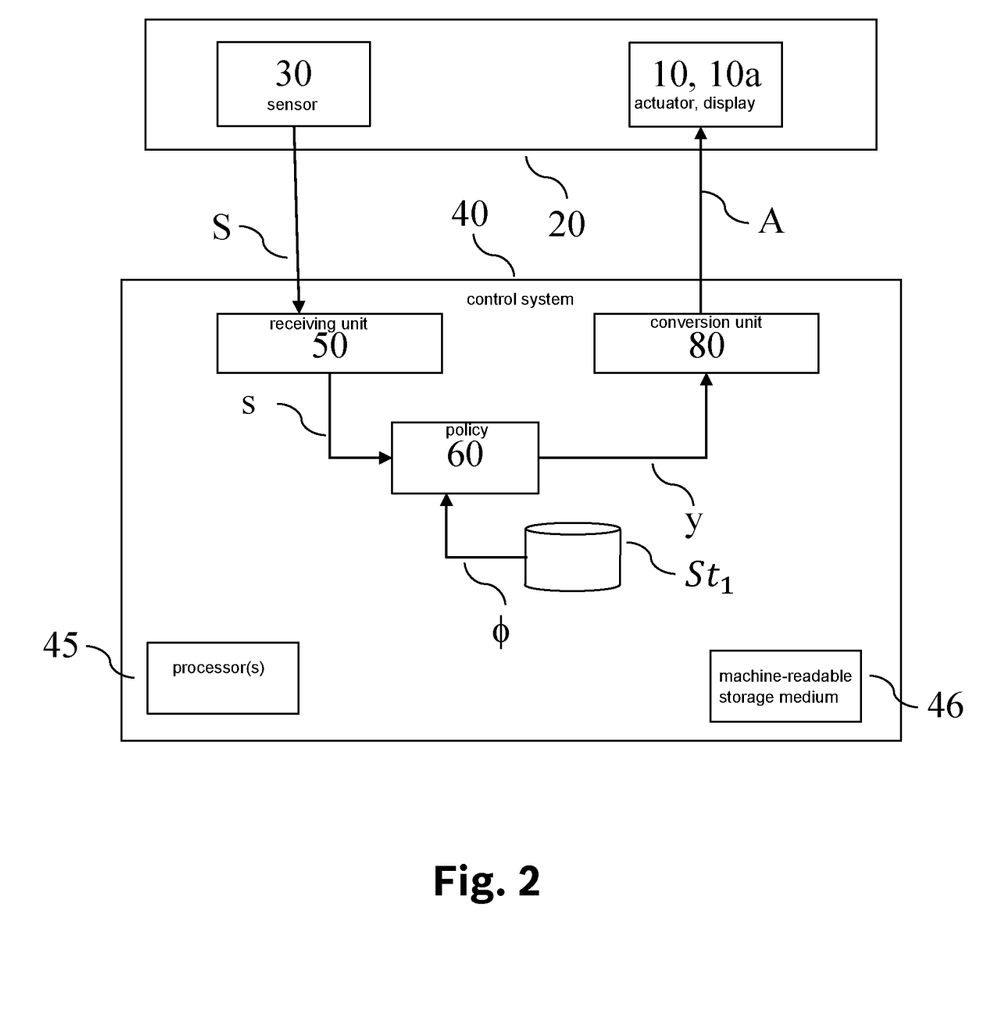
FIG. 2 shows a control system having a classifier controlling an actuator in its environment, in accordance with an example embodiment of the present invention.

Shown in FIG. 2 is one embodiment of an actuator 10 in its environment 20. Actuator 10 interacts with a control system 40. Actuator 10 and its environment 20 will be jointly called actuator system. At preferably evenly spaced distances, a sensor 30 senses a condition of the actuator system. The sensor 30 may comprise several sensors. An output signal S of sensor 30 (or, in case the sensor 30 comprises a plurality of sensors, an output signal S for each of the sensors) which encodes the sensed condition is transmitted to the control system 40. Possible sensors include but are not limited to: gyroscopes, accelerometers, force sensors, cameras, radar, lidar, angle encoders, etc. Note that oftentimes sensors do not directly measure the state of the system but rather observe a consequence of the state, e.g., a camera detects an image instead of directly the relative position of a car to other traffic participants. However, it is possible to filter the state from high-dimensional observations like images or lidar measurements.

Thereby, control system 40 receives a stream of sensor signals S. It then computes a series of actuator control commands A depending on the stream of sensor signals S, which are then transmitted to actuator 10.

Control system 40 receives the stream of sensor signals S of sensor 30 in an optional receiving unit 50. Receiving unit 50 transforms the sensor signals S into states s. Alternatively, in case of no receiving unit 50, each sensor signal S may directly be taken as an input signal s.

Input signal s is then passed on to policy 60, which may, for example, be given by an artificial neural network.

Policy 60 is parametrized by parameters $\phi$, which are stored in and provided by parameter storage $St_1$.

Policy 60 determines output signals y from input signals s. The output signal y may be an action a. Output signals y are transmitted to an optional conversion unit 80, which converts the output signals y into the control commands A. Actuator control commands A are then transmitted to actuator 10 for controlling actuator 10 accordingly. Alternatively, output signals y may directly be taken as control commands A.

Actuator 10 receives actuator control commands A, is controlled accordingly and carries out an action corresponding to actuator control commands A. Actuator 10 may comprise a control logic which transforms actuator control command A into a further control command, which is then used to control actuator 10.

In further embodiments, control system 40 may comprise sensor 30. In even further embodiments, control system 40 alternatively or additionally may comprise actuator 10.

In one embodiment policy 60 may be designed signal for controlling a physical system, e.g., a computer-controlled machine, a robot, a vehicle, a domestic appliance, a power tool, a manufacturing machine, or an access control system. It does so by learning a policy for controlling the physical system and then operating the physical system accordingly.

In still further embodiments, it may be envisioned that control system 40 controls a display 10a instead of an actuator 10.

Furthermore, control system 40 may comprise a processor 45 (or a plurality of processors) and at least one machine-readable storage medium 46 on which instructions are stored which, if carried out, cause control system 40 to carry out a method according to one aspect of the invention.

Figure 3:
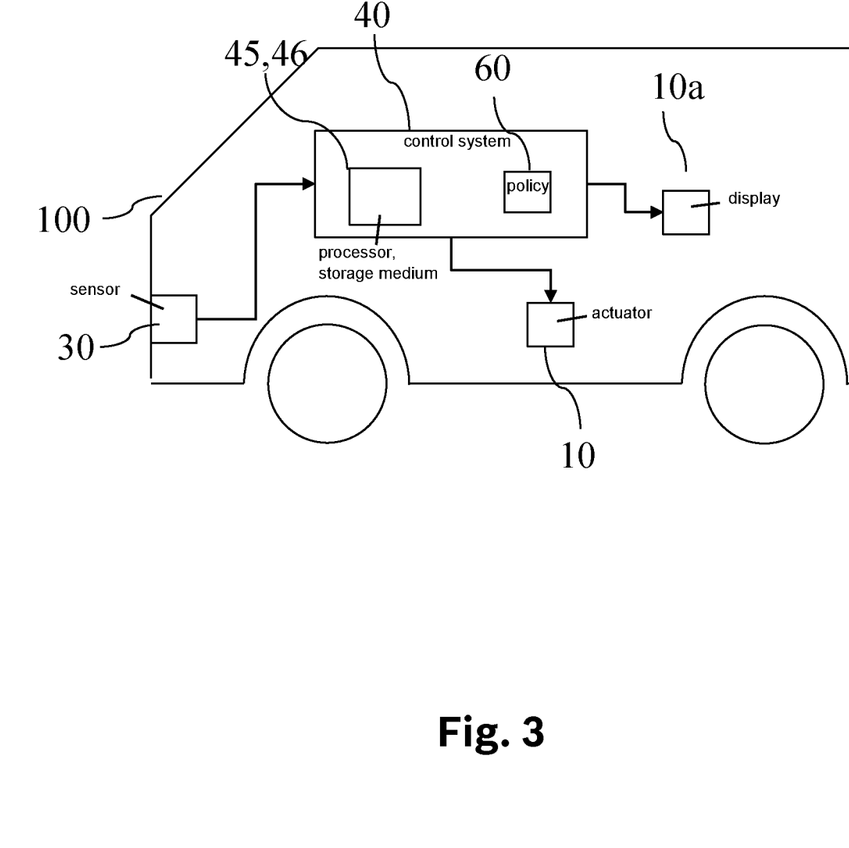
FIG. 3 shows the control system controlling an at least partially autonomous robot, in accordance with an example embodiment of the present invention.

FIG. 3 shows an embodiment in which control system 40 is used to control an at least partially autonomous robot, e.g. an at least partially autonomous vehicle 100.

Sensor 30 may comprise one or more video sensors and/or one or more radar sensors and/or one or more ultrasonic sensors and/or one or more LiDAR sensors and or one or more position sensors (like, e.g., GPS). Some or all of these sensors are preferably but not necessarily integrated in vehicle 100.

Alternatively or additionally sensor 30 may comprise an information system for determining a state of the actuator system. One example for such an information system is a weather information system which determines a present or future state of the weather in environment 20.

For example, using input signal s, the policy 60 may for example control the at least partially autonomous robot to achieve a predefined goal state. Output signal y controls the at least partially autonomous robot.

Actuator 10, which is preferably integrated in vehicle 100, may be given by a brake, a propulsion system, an engine, a drivetrain, or a steering of vehicle 100. Preferably, actuator control commands A may be determined such that actuator (or actuators) 10 is/are controlled such that vehicle 100 avoids collisions with objects in the environment of the at least partially autonomous robot.

Preferably, the at least partially autonomous robot is an autonomous car. A possible description of the car's state can include its position, velocity, relative distance to other traffic participants, the friction coefficient of the road surface (can vary for different environments e.g. rain, snow, dry, etc.). Sensors that can measure this state include gyroscopes, angle encoders at the wheels, camera/lidar/radar, etc. The reward signal for this type of learning would characterize on how well a pre-computed trajectory, a.k.a. reference trajectory, is followed by the car. The reference trajectory can be determined by an optimal planner. Actions for this systems can be a steering angle, brakes and/or gas. Preferably, the break pressure or the steering angle is outputted by the policy, in particular such that a minimal braking distance is achieved or to carry out an evasion maneuver, as a (sub-) optimal planner would do it.

It is noted that for this embodiment, the policy can be learned for controlling dynamics and/or stability of the at least partially autonomous robot. For example if the robot is in a safety critical situation, the policy can control the robot to maneuver it out of said critical situation, e.g. by carrying out an emergency break. The policy can then output a value characterizing a negative acceleration, wherein the actor is then controlled depending on said value, e.g. breaks with a force related to the negative acceleration.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot.

In a further embodiment, the at least partially autonomous robot may be given by a gardening robot (not shown), which uses sensor 30, preferably an optical sensor, to determine a state of plants in the environment 20. Actuator 10 may be a nozzle for spraying chemicals. An actuator control command A may be determined to cause actuator 10 to spray the plants with a suitable quantity of suitable chemicals.

In even further embodiments, the at least partially autonomous robot may be given by a domestic appliance (not shown), like, e.g., a washing machine, a stove, an oven, a microwave, or a dishwasher. Sensor 30, e.g., an optical sensor, may detect a state of an object which is to undergo processing by the household appliance. For example, in the case of the domestic appliance being a washing machine, sensor 30 may detect a state of the laundry inside the washing machine. Actuator control signal A may then be determined depending on a detected material of the laundry.

Figure 4:
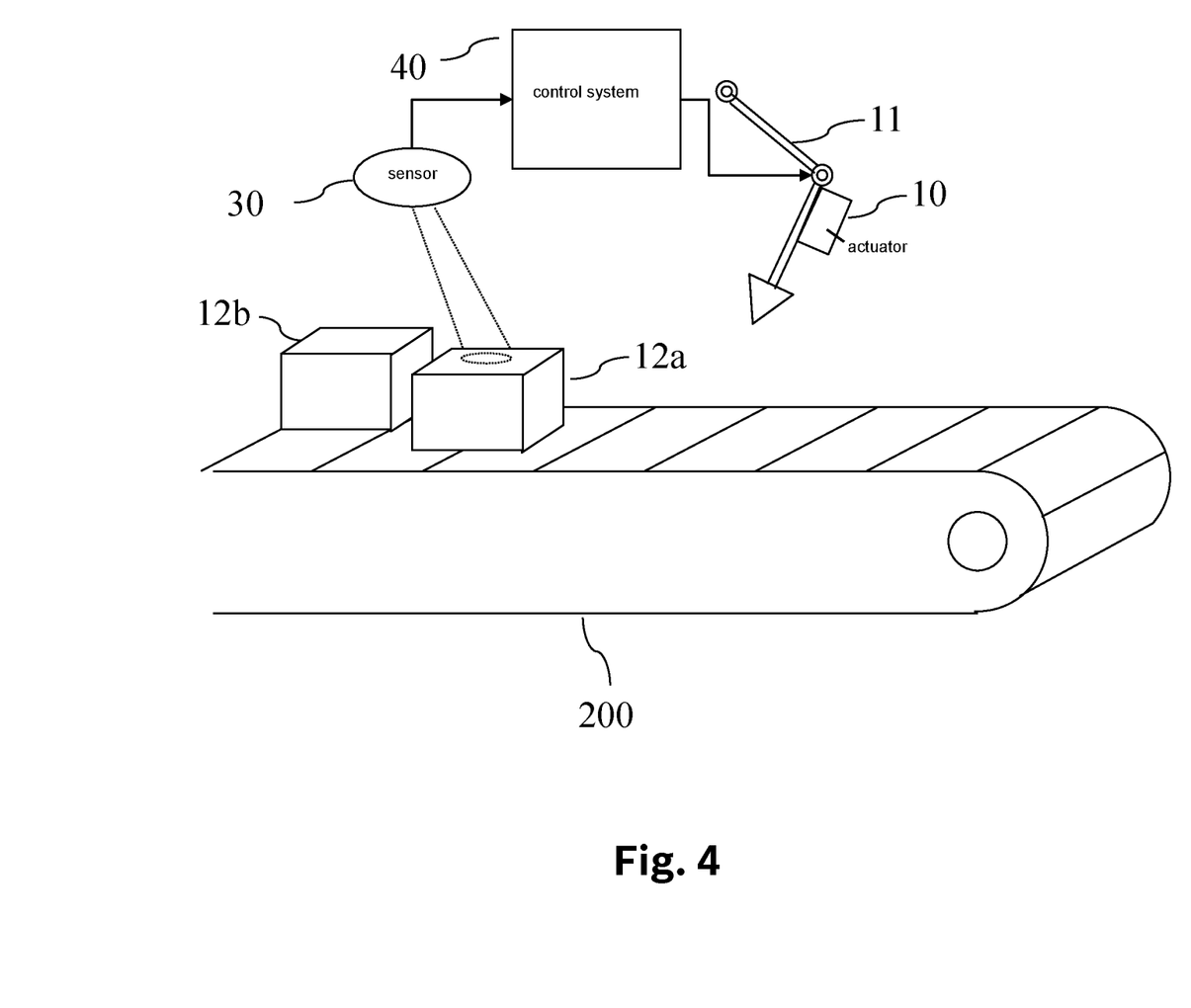
FIG. 4 shows the control system controlling a manufacturing machine, in accordance with an example embodiment of the present invention.

Shown in FIG. 4 is an embodiment in which control system 40 is used to control a manufacturing machine 11, e.g. a punch cutter, a cutter or a gun drill) of a manufacturing system 200, e.g. as part of a production line. The control system 40 controls an actuator 10 which in turn control the manufacturing machine 11.

Sensor 30 may be given by an optical sensor which captures properties of e.g. a manufactured product 12. Policy 60 may determine depending on a state of the manufactured product 12 an action to manipulate the product 12. Actuator 10 which controls manufacturing machine 11 may then be controlled depending on the determined state of the manufactured product 12 for a subsequent manufacturing step of manufactured product 12. Or, it may be envisioned that actuator 10 is controlled during manufacturing of a subsequent manufactured product 12 depending on the determined state of the manufactured product 12.

A preferred embodiment for manufacturing relates to autonomously (dis-)assemble certain objects by robotics. State can be determined depending on sensors. Preferably, for assembling objects the state characterizes the robotic manipulator itself and the objects that should be manipulated. For the robotic manipulator, the state can consist of its joint angles and angular velocities as well as the position and orientation of its end-effector. This information can be measured by angle encoders in the joints as well as gyroscopes that measure the angular rates of the robot joints. From the kinematic equations, it is possible to deduct the end-effectors position and orientation. Instead, it is also possible to utilize camera images or lidar scans to infer the relative position and orientation to the robotic manipulator. The reward signal for a robotic task could be for example split into different stages of the assembly process. For example when inserting a peg into a hole during the assembly, a suitable reward signal would be to encode the peg's position and orientation relative to the hole. Typically, robotic systems are actuated via electrical motors at each joint. Depending on the implementation, the actions of the learning algorithms could therefore be either the required torques or directly the voltage/current applied to the motors.

Figure 5:
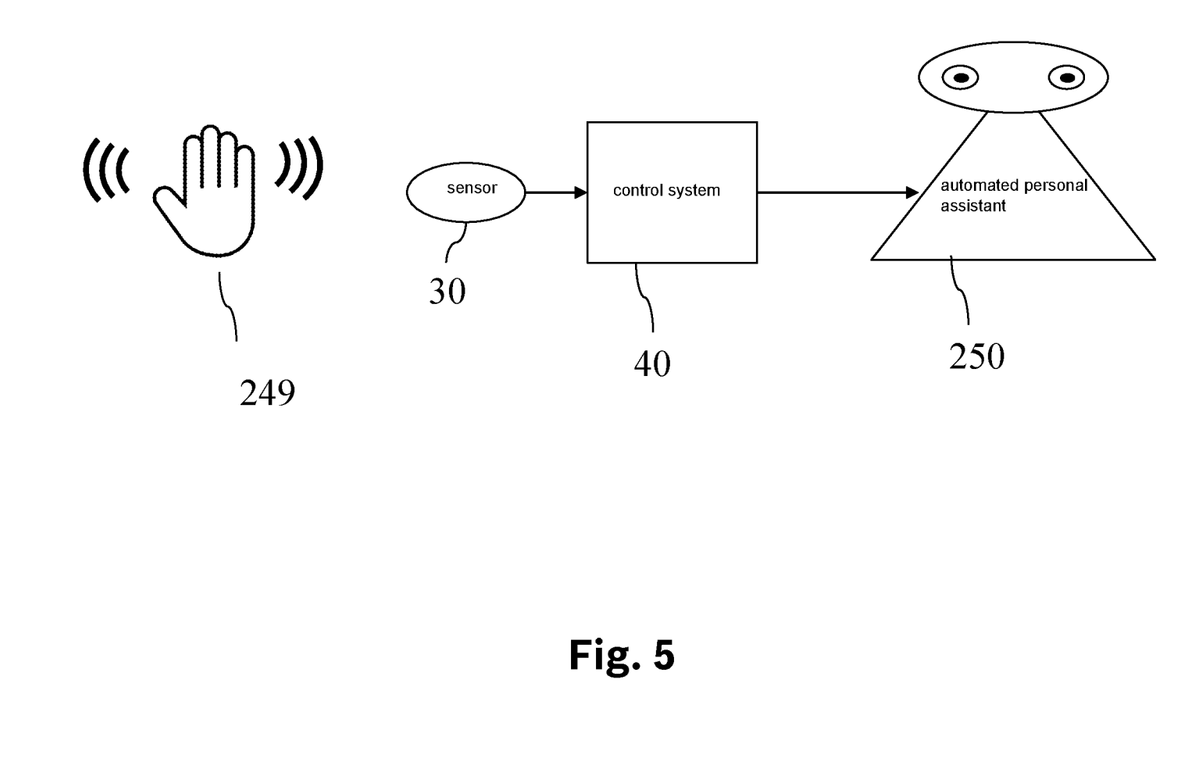
FIG. 5 shows the control system controlling an automated personal assistant, in accordance with an example embodiment of the present invention.

Shown in FIG. 5 is an embodiment in which control system 40 is used for controlling an automated personal assistant 250. Sensor 30 may be an optic sensor, e.g. for receiving video images of a gestures of user 249. Alternatively, sensor 30 may also be an audio sensor e.g. for receiving a voice command of user 249.

Control system 40 then determines actuator control commands A for controlling the automated personal assistant 250. The actuator control commands A are determined in accordance with sensor signal S of sensor 30. Sensor signal S is transmitted to the control system 40. For example, policy 60 may be configured to, e.g., determine an action depending on the state characterizing a gesture recognition, which can be determined by an algorithm to identify a gesture made by user 249. Control system 40 may then determine an actuator control command A for transmission to the automated personal assistant 250. It then transmits said actuator control command A to the automated personal assistant 250.

For example, actuator control command A may be determined in accordance with the identified user gesture recognized by classifier 60. It may then comprise information that causes the automated personal assistant 250 to retrieve information from a database and output this retrieved information in a form suitable for reception by user 249.

In further embodiments, it may be envisioned that instead of the automated personal assistant 250, control system 40 controls a domestic appliance (not shown) controlled in accordance with the identified user gesture. The domestic appliance may be a washing machine, a stove, an oven, a microwave or a dishwasher.

Figure 6:
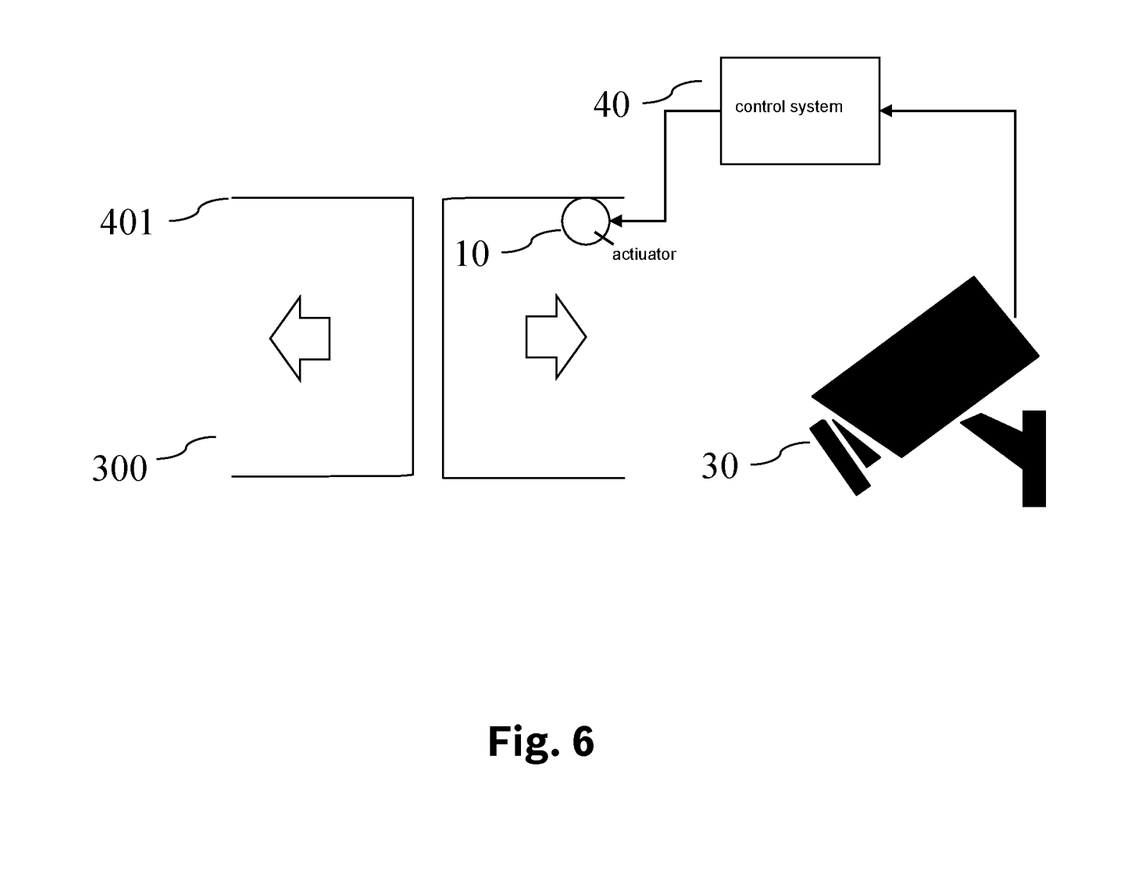
FIG. 6 shows the control system controlling an access control system, in accordance with an example embodiment of the present invention.

Shown in FIG. 6 is an embodiment in which control system controls an access control system 300. Access control system may be designed to physically control access. It may, for example, comprise a door 401. Sensor 30 is configured to detect a scene that is relevant for deciding whether access is to be granted or not. It may for example be an optical sensor for providing image or video data, for detecting a person's face.

Figure 7:
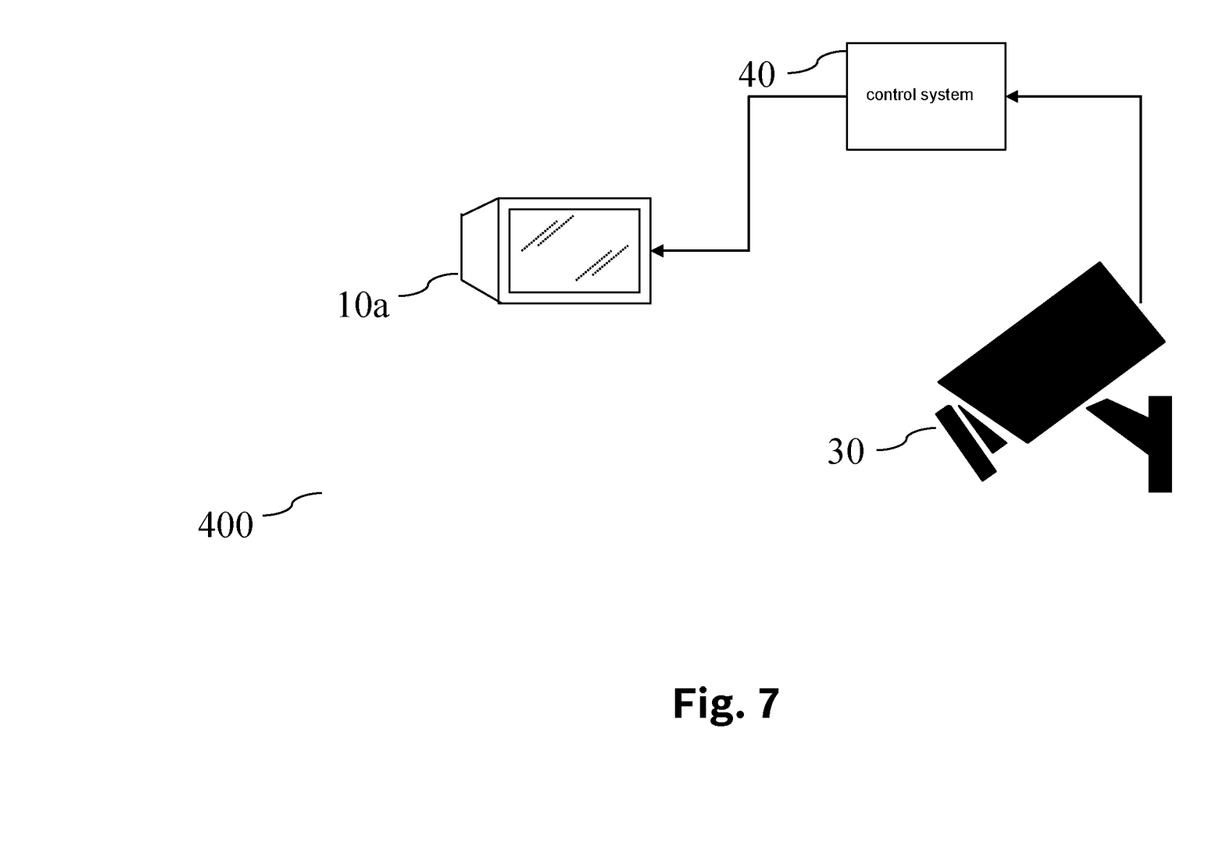
FIG. 7 shows the control system controlling a surveillance system, in accordance with an example embodiment of the present invention.

Shown in FIG. 7 is an embodiment in which control system 40 controls a surveillance system 400. This embodiment is largely identical to the embodiment shown in FIG. 5. Therefore, only the differing aspects will be described in detail. Sensor 30 is configured to detect a scene that is under surveillance. Control system does not necessarily control an actuator 10, but a display 10a. For example, the machine learning system 60 may determine a classification of a scene, e.g. whether the scene detected by optical sensor 30 is suspicious. Actuator control signal A which is transmitted to display 10a may then e.g. be configured to cause display 10a to adjust the displayed content dependent on the determined classification, e.g. to highlight an object that is deemed suspicious by machine learning system 60.

Figure 8:
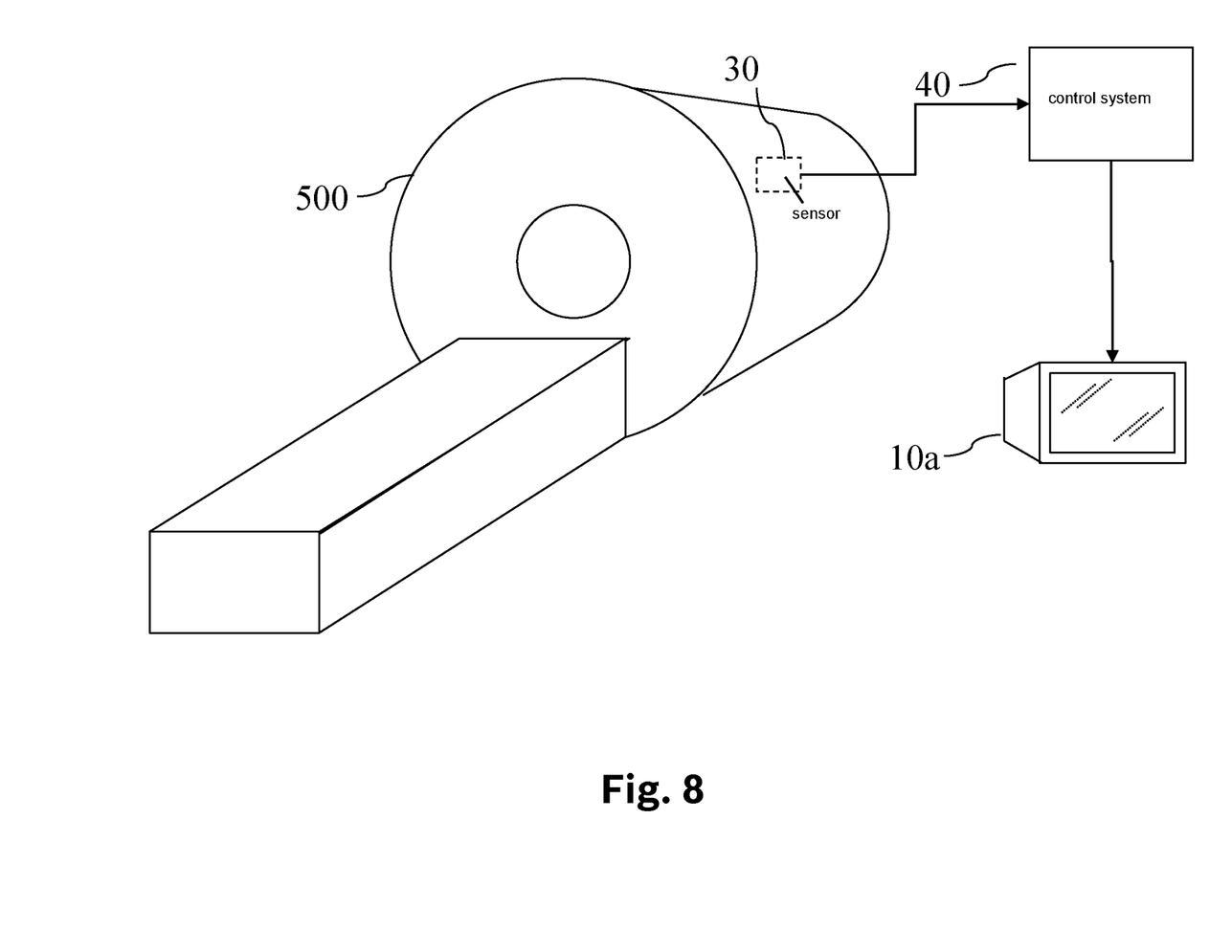
FIG. 8 shows the control system controlling an imaging system, in accordance with an example embodiment of the present invention.

Shown in FIG. 8 is an embodiment of a control system 40 for controlling an imaging system 500, for example an MRI apparatus, x-ray imaging apparatus or ultrasonic imaging apparatus. Sensor 30 may, for example, be an imaging sensor. Policy 60 may then determine based on its input state the an action characterizing a trajectory to take a recoding of the imaging system 500.

The term "computer" covers any device for the processing of pre-defined calculation instructions. These calculation instructions can be in the form of software, or in the form of hardware, or also in a mixed form of software and hardware.

It is further understood that the procedures cannot only be completely implemented in software as described. They can also be implemented in hardware, or in a mixed form of software and hardware.

What is claimed is:

1. A computer-implemented method for operating an agent depending on a learned policy obtained by:
    initializing a policy and a transition dynamics model which predicts a next state of an environment and/or of the agent; and
    repeating the following steps until a termination condition is fulfilled:
        recording at least an episode of interactions of the agent with the environment following the policy and adding the recorded episode to a set of training data,
        optimizing the transition dynamics model based on the training data such that the transition dynamics model predicts next states of the environment depending on states and actions contained in the training data, and
        optimizing policy parameters of the policy based on the training data and the transition dynamics model by optimizing a reward over at least one episode by following the policy;
    wherein the transition dynamics model includes a first model representing a learned model of the environment and a correction model which is configured to correct errors of the first model;
    wherein the method includes:
        sensing the environment using a sensor of the agent;
        determining a current state depending on the sensed environment;
        determining, using the learning policy, an action for the agent depending on the current state;
        carrying out the determined action, by the agent, wherein the correction model is optimized such that, when actions are selected as done when recording the episodes of the training data, then a sequence of states predicted by the transition dynamics model will be equal to the recorded states of the training data.

2. The method according to claim 1, wherein the correction model is selected by minimizing a difference between an output of the correction model and a difference between the recorded state of the training data and the predicted state by the first model.

3. A computer-implemented method for operating an agent depending on a learned policy obtained by:
    initializing a policy and a transition dynamics model which predicts a next state of an environment and/or of the agent; and
    repeating the following steps until a termination condition is fulfilled:
        recording at least an episode of interactions of the agent with the environment following the policy and adding the recorded episode to a set of training data,
        optimizing the transition dynamics model based on the training data such that the transition dynamics model predicts next states of the environment depending on states and actions contained in the training data, and optimizing policy parameters of the policy based on the training data and the transition dynamics model by optimizing a reward over at least one episode by following the policy;
wherein the transition dynamics model includes a first model representing a learned model of the environment and a correction model which is configured to correct errors of the first model;
wherein the method includes:
sensing the environment using a sensor of the agent;
determining a current state depending on the sensed environment;
determining, using the learning policy, an action for the agent depending on the current state;
carrying out the determined action, by the agent, wherein the correction model is dependent on a state or a time, wherein the time characterizes a time span elapsed since a beginning of a respective episode.

4. The method according to claim 3, wherein the environment is deterministic and the correction model is dependent on the time.

5. A computer-implemented method for operating an agent depending on a learned policy obtained by:
initializing a policy and a transition dynamics model which predicts a next state of an environment and/or of the agent; and
repeating the following steps until a termination condition is fulfilled:
recording at least an episode of interactions of the agent with the environment following the policy and adding the recorded episode to a set of training data,
optimizing the transition dynamics model based on the training data such that the transition dynamics model predicts next states of the environment depending on states and actions contained in the training data, and
optimizing policy parameters of the policy based on the training data and the transition dynamics model by optimizing a reward over at least one episode by following the policy;
wherein the transition dynamics model includes a first model representing a learned model of the environment and a correction model which is configured to correct errors of the first model;
wherein the method includes:
sensing the environment using a sensor of the agent;
determining a current state depending on the sensed environment;
determining, using the learning policy, an action for the agent depending on the current state;
carrying out the determined action, by the agent, wherein the correction model is a probabilistic function, and wherein the probabilistic function is optimized by approximate inference.

6. A computer-implemented method for operating an agent depending on a learned policy obtained by:
initializing a policy and a transition dynamics model which predicts a next state of an environment and/or of the agent; and
repeating the following steps until a termination condition is fulfilled:
recording at least an episode of interactions of the agent with the environment following the policy and adding the recorded episode to a set of training data,
optimizing the transition dynamics model based on the training data such that the transition dynamics model predicts next states of the environment depending on states and actions contained in the training data, and
optimizing policy parameters of the policy based on the training data and the transition dynamics model by optimizing a reward over at least one episode by following the policy;
wherein the transition dynamics model includes a first model representing a learned model of the environment and a correction model which is configured to correct errors of the first model;
wherein the method includes:
sensing the environment using a sensor of the agent;
determining a current state depending on the sensed environment;
determining, using the learning policy, an action for the agent depending on the current state;
carrying out the determined action, by the agent, wherein the correction model is optimized jointly with the first model.

7. The method according to claim 6, wherein the agent is an at least partially autonomous robot and/or a manufacturing machine and/or an access control system.

8. The method according to claim 6, carrying out the determined action, by the agent, wherein for optimizing the transition dynamics model, after optimizing the first model on the training data, the correction model is selected such that error of the first model is minimized for actions selected from the policy on the training data.

9. A machine-readable storage medium on which is stored a computer program for learning a policy for an agent, the computer program, when executed by a computer, causing the computer to perform the following steps:
initializing a policy and a transition dynamics model which predicts a next state of an environment and/or of the agent; and
repeating the following steps until a termination condition is fulfilled:
recording at least an episode of interactions of the agent with the environment following the policy and adding the recorded episode to a set of training data,
optimizing the transition dynamics model based on the training data such that the transition dynamics model predicts next states of the environment depending on states and actions contained in the training data, and
optimizing policy parameters of the policy based on the training data and the transition dynamics model by optimizing a reward over at least one episode by following the policy;
wherein the transition dynamics model includes a first model representing a learned model of the environment and a correction model which is configured to correct errors of the first model, wherein the computer program, when executed by the computer, causing the computer to perform the following further steps:
sensing the environment using a sensor of the agent;
determining a current state depending on the sensed environment;
determining, using the learning policy, an action for the agent depending on the current state;
carrying out the determined action, by the agent wherein the correction model is optimized jointly with the first model.

10. A control system for operating an actuator, control system comprising:
a policy trained by:
initializing a policy and a transition dynamics model which predicts a next state of an environment and/or of the agent; and repeating the following steps until a termination condition is fulfilled:
    recording at least an episode of interactions of the agent with the environment following the policy and adding the recorded episode to a set of training data,
    optimizing the transition dynamics model based on the training data such that the transition dynamics model predicts next states of the environment depending on states and actions contained in the training data, and
    optimizing policy parameters of the policy based on the training data and the transition dynamics model by optimizing a reward over at least one episode by following the policy;
wherein the transition dynamics model includes a first model representing a learned model of the environment and a correction model which is configured to correct errors of the first model;
wherein the control system is configured to operate the actuator in accordance with an output of the policy, wherein the correction model is optimized jointly with the first model.

* * * * *